Patented Apr. 23, 1940

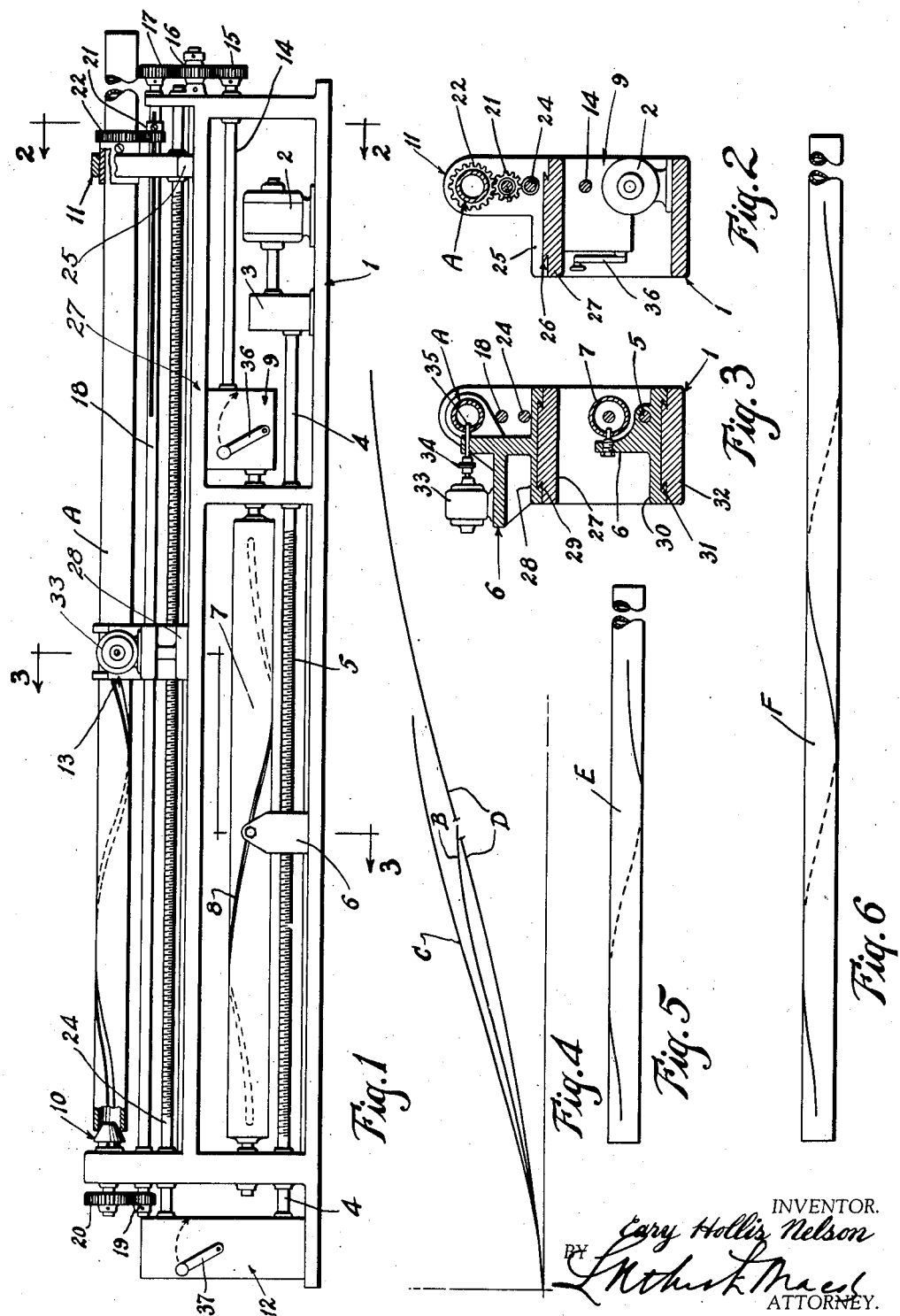

2,197,825

UNITED STATES PATENT OFFICE 2,197,825

MILLING MACHINE

Cary Hollis Nelson, Altadena, Calif.

Application November 2, 1936, Serial No. 108,716
Renewed August 7, 1939

14 Claims. (Cl. 90—13.9)

This invention relates to and has for an object thereof the provision of a milling machine which is especially constructed for cutting helical guide grooves or slots in the float guide members of float operated liquid level gauges for liquid storage tanks, especially horizontal cylindrical tanks.

In the construction of such gauges for horizontal cylindrical tanks wherein the volume is not directly proportional to the levels therein, and wherein the gauge comprises a float rotated by a helically grooved or slotted guide member responsive to changes in the level of the liquid in the tank, and the float in turning moves an indicator over an evenly graduated dial, it is necessary that the pitch of the grooves or slots be accurately varied according to the varying relationship of the volume to the diameter of the tank and to tanks of different sizes.

Heretofore, the provision of such grooves or slots of proper and accurate form has been a difficult, painstaking and costly operation for dials having equally spaced graduations, or has required the use of dials having various spaced graduations which has necessitated especially prepared dials for horizontal cylindrical tanks of varying sizes.

It is, therefore, an important object of this invention to provide a machine which may be quickly, easily, and comparatively inexpensively operated to cut helical slots in the desired pitch in the float guide members for such liquid level gauges.

A further object is to provide a machine of the character described which may be readily manipulated to cut the grooves or slots of varying pitch to suit tanks of varying diameter and capacity, while using standardized dials having uniformly spaced graduations.

More specifically, this invention contemplates a machine which will cut or reproduce a regularly distorted helical slot or guide which may have an equal and opposite component, if desired, wherein the degrees of a radial advance per unit of length along the helix center line, this line being the diameter of a circle, are directly proportional to the areas inside the perimeter and between parallel chords of that circle, said chords being spaced the same as said units of length and at right angles to said helix center line. Slots or guides of these characteristics with the float will provide for the advantages hereinbefore noted in a particularly efficacious manner.

Moreover, it is another object of this invention to provide a machine wherein a template having a groove of a given pattern or regularly distorted helical form is rotated at a given speed by drive means, which is a laterally movable member engaging in said groove, and the template, through a variable speed drive connection with work chucks, will rotate the work through some fraction or multiple and fraction of the total degrees of revolution of the template, simultaneously with the rotation of the template. Furthermore, the means for driving the template operates through a variable speed connection for the lateral movement of a cutting tool, through any fraction of the length of the machine greater or less than the length of the template, while the template groove engaging member moves the full length of said groove. By these means the machine may be operated to cut helical slots or grooves in given varying lengths and degrees of revolution while maintaining a constant distortion in all cases.

Other objects may appear as the description progresses.

I have shown a preferred form of my invention in the accompanying drawing, subject to modification within the scope of the appended claims without departing from the spirit of my invention.

Referring to the drawing:

Fig. 1 is a front elevation of one embodiment of the milling machine of this invention;

Fig. 2 is a sectional view taken on the plane of line 2—2 of Fig. 1;

Fig. 3 is a sectional view taken on the plane of line 3—3 of Fig. 1;

Fig. 4 is a diagram of the given curve of the template and typical variational curves which are provided with the variable pitch of the grooves or slots;

Figs. 5 and 6 are fragmentary top plan views of two specimens of work having slots following the curves shown in the upper and lower diagram lines of Fig. 4.

With particular reference to the drawing, the embodiment of the invention shown therein comprises a frame 1 and a motor 2 which, through reduction gearing 3, operates a driving shaft 4. This shaft has a screw threaded portion 5 which actuates a driving member 6 threadedly engaged therewith. A cylindrical template 7 having a helical pattern groove 8 is rotated by the member 6 engaging with said groove. This template through variable speed transmission means 9 rotates work chucks 10 and 11 at the same speed as the template or as otherwise desired. Through a similar transmission means 12 the shaft 4 drives a laterally movable tool chuck 13 at the same speed as the shaft 4 or otherwise as desired.

It will be noted that the variable speed means 9 is adapted to rotate at various speeds, a shaft 14 which, through gears 15, 16 and 17, rotates a shaft 18. The shaft 18 drives the work chucks 10 and 11 through gears 19 and 20 and 21 and 22 respectively. Gear 21 is splined on said shaft, whereby the chuck 11, which is suitably laterally adjustably mounted on the machine, will be driven in any adjusted position thereof. Chuck 11 is constructed to slidably yet rotatably receive the rod or tube A, which is to be helically grooved or slotted, and thereby provides for cutting grooves or slots in rods or tubes of greater or lesser length than the helical pattern guide.

The variable speed device 12 is arranged to rotate at various speeds a feed screw 24 which is threadedly engaged with and thereby moves the tool chuck 13 laterally at whatever speed desired, depending on the nature of the helical groove to be cut.

The base 25 of the adjustable work chuck 11 has a slidable dovetailed joint 26 with the frame member 27, and a similar base 28 of the tool chuck 13 has a similar joint 29 with said frame member. Similarly the drive member 6 has a base 30 which has a dovetailed sliding connection as at 31 with the member 32 of the frame 1. This arrangement provides for rigidity while permitting of free and accurate movements of the parts 6, 11 and 13.

It will be noted that the tool chuck 13 includes a motor 33 adapted to rotate a tool holder 34 in which a groove or slot cutting tool 35 is held so as to engage the work, as shown in Fig. 3.

The variable speed transmission devices 9 and 12 may be of any conventional form provided that upon manipulation of the handles 36 and 37 thereof, said devices will operate the work and the tool chucks at various speeds as desired.

In the operation of the machine, for example, to cut a helical slot in the tube A, as shown in Fig. 1, the operator having first determined the degree of revolution and the length along the tube centerline of the helical slot to be cut in said tube, in consideration of the diameter and capacity of the particular horizontal cylindrical storage tanks for which the tube is to be prepared, now sets the tube in place and adjusts the variable speed devices 9 and 12 before starting the motors 2 and 33. It will be noted that the helical pattern groove 8 of the template 7 has a regularly distorted helical curve of a given length with a given number of convolutions. This groove, in other words, has a pitch variance common to any horizontal cylindrical tank of given size. The template "curve" is indicated by line B in Fig. 4.

Upon now starting the motors 2 and 33, the work or tube A will be rotated and the cutter tool will be advanced along and thereby reproduce the desired groove or slot or guide in or on the tube A, as controlled by the settings of the variable speed devices 9 and 12.

If it is desired, for example, to produce a slot in the tube A identical with the pattern groove 8 of the template 7, the transmission 9 is manipulated to rotate the tube at the same speed as the template and the transmission means 12 is set to feed the cutter at a lateral speed equal to movement of the drive means 6 in the pattern groove 8. A slot thus cut will have the curve indicated at B in Fig. 4.

It will be seen that by various speed settings for rotation of the tube or work to have a groove or slot cut therein, and likewise by various speed settings for the lateral movement of the cutter, both relative to the speed or rotation of the template and the speed of movement of the drive means 6 in the template groove 8, I may reproduce helical slots or grooves of various length and revolution to suit tanks of various diameters and capacities. In other words, the machine hereof will provide for readily and accurately cutting grooves or slots of given varying lengths and degrees of revolution while maintaining a similar or constant distortion in all cases. For example, I may form grooves or slots having the curves as indicated at C and D in Fig. 4, or may otherwise yet similarly vary the template curve.

In terms of volume, the machine of this invention may be said to provide a regularly distorted helical slot, which may or may not have an equal and opposite component, wherein the degrees of radial advance per unit of length along its (the helix) center line (this center line being the true diameter of a cylinder), are directly proportional to the volumes inside the cylinder and between parallel planes dissecting the cylinder, said planes spaced the same as said units of length, and being perpendicular to said helix center line.

In Figs. 5 and 6 are shown two samples E and F of work having the slots following the curves shown in lines C and D, respectively, of Fig. 4.

While the present embodiment is particularly designed for cutting grooves or slots, it is to be understood that any modification of this embodiment which will cut a rib or some other form of helical guide corresponding in shape and function to the groove or slot herein described, will be within the scope of this invention.

It should be noted that any suitable means may be employed for returning the members 6 and 13 to normal position. If desired, this can be accomplished by reversing the motor 2, while the cutting tool is disengaged from the work.

What I claim is:

1. In a milling machine, a rotary template, rotary work holding means, means for rotating said template including a driving shaft, a variable speed driving connection between said template and said work holding means, a cutting tool, means for advancing said tool axially of the work, including a rotary shaft, and a variable speed driving connection between said shafts.

2. In a milling machine, a rotary template, rotary work holding means, means for rotating said template including a driving shaft and a member slidably engaging said template, a variable speed driving connection between said template and said work holding means, a cutting tool, means for advancing said tool axially of the work, including a rotary shaft, and a variable speed driving connection between said shafts.

3. In a milling machine, a rotary template having a peripheral helical groove, rotary work holding means, means for rotating said template including a driving shaft and a slidable member engaged in said groove, a variable speed driving connection between said template and said work holding means, a cutting tool, means for advancing said tool axially of the work, including a rotary shaft, and a variable speed driving connection between said shafts.

4. In a milling machine, a rotary template having a helical guide therein, a member engaging in said guide, a feed screw threadedly engaged with and for moving said member axially of said template, a rotary work holding means, a variable speed driving connection between said template and said work holding means, a cutting tool, means for advancing said tool axially of the work including a rotary feed screw, and a driving connection between said feed screws.

5. In a milling machine, a rotary template, means for rotating said template, including a member engaging and moving axially of the template, a rotary work holding means, means driven by the template for rotating said work holding means, a cutting tool, means for moving said tool axially of the work and a variable speed drive connection between last named means and said template rotating means for varying the speed of movement of the cutting tool.

6. In a milling machine, a rotary template, a rotary work holder, a cutting tool, means for moving the cutting tool axially of the work, including a rotary shaft, means for rotating the template, including a driving shaft, a variable speed driving connection between said shafts, a manually operable control member for said variable speed means, a variable speed driving connection between said template and said rotary work holder and manually operable control means for said last named variable speed connection.

7. In a milling machine, a rotary template, a rotary work holder, means for rotating said template, including a driving shaft, a drive connection between said template and said work holder including manually operable means for effecting various speed settings of said drive means, a cutting tool, means for advancing said tool axially of the work including a rotary shaft, and a drive connection between said shafts including various speed settings and manually operable means for changing said settings.

8. In a milling machine, a rotary template having a helical guide groove therein, a drive member engaging in said groove, a feed screw threadedly engaged with and moving said drive member axially of said template, a rotary work holder, means driven by said template for rotating said work holder and including a change speed device and manually operable means for setting said device for operation at various speeds, a cutting tool, means for advancing said tool axially of the work, including a rotary feed screw, a drive connection between said feed screws, and a manually operable change speed device between said feed screws.

9. In a milling machine, a rotary template having a regularly distorted helical guide element wherein the degrees of radial advance per unit of length along the helix center line, this line being the true diameter of a cylinder, are directly proportional to the volumes inside the cylinder and between parallel planes bisecting the cylinder, said planes being spaced the same as said units of length and being perpendicular to said helix center line, a rotary work holder, means for rotating said template, including a driving shaft, a drive connection between said template and said work holder including manually operable means for effecting various speed settings of said drive means, a cutting tool, means for advancing said tool axially of the work including a rotary shaft, and a drive connection between said shafts including various speed settings and manually operable means for changing said settings.

10. In a milling machine, a rotary template having a helical guide groove wherein the degrees of radial advance per unit of length along the helix center line, this line being the true diameter of a cylinder, are directly proportional to the volumes inside the cylinder and between parallel planes bisecting the cylinder, said planes being spaced the same as said units of length and being perpendicular to said helix center line, a drive member engaging in said groove, a feed screw threadedly engaged with and moving said drive member axially of said template, a rotary work holder, means driven by said template for rotating said work holder and including a change speed device and manually operable means for setting said device for operation at various speeds, a cutting tool, means for advancing said tool axially of the work, including a rotary feed screw, a drive connection between said feed screws, and a manually operable change speed device between said feed screws.

11. In a milling machine, a rotary template having a regularly distorted helical guide element wherein the degrees of radial advance per unit of length along the helix center line, the center line being the diameter of a circle, are directly proportional to the areas inside of the perimeter and between parallel chords of that circle, said chords spaced the same as said units of length and at right angles to said helix center line, a rotary work holder, means for rotating said template, including a driving shaft, a drive connection between said template and said work holder including manually operable means for effecting various speed settings of said drive means, a cutting tool, means for advancing said tool axially of the work inducing a rotary shaft, and a drive connection between said shafts including various speed settings and manually operable means for changing said settings.

12. In a milling machine, a rotary template having a helical guide groove wherein the degrees of radial advance per unit of length along the helix center line, the center line being the diameter of a circle, are directly proportional to the areas inside of the perimeter and between parallel chords of that circle, said chords spaced the same as said units of length and at right angles to said helix center line, a drive member engaging in said groove, a feed screw threadedly engaged with and moving said drive member axially of said template, a rotary work holder, means driven by said template for rotating said work holder and including a change speed device and manually operable means for setting said device for operation at various speeds, a cutting tool, means for advancing said tool axially of the work, including a rotary feed screw, a drive connection between said feed screws, and a manually operable change speed device between said feed screws.

13. In a milling machine, means for predetermining the path of a tool in relation to the work, a drive member therefor, a rotary work holder, a drive connection between said means and said work holder including a change speed device, a manually operable means for setting said device for operating said work holder at various speeds, a tool, means for moving said tool axially of the work simultaneously with the operation of said drive member, including a change speed device, and manually operable means for setting said device for controlling the axial speed of said tool to form in the work a regularly distorted helical element with predetermined length and predetermined degrees of radial advance as per said path.

14. In a milling machine, means for predetermining the path of a tool in relation to the work, a drive member therefor, a rotary work holder, a drive connection between said means and said work holder including a change speed device, a manually operable means for setting said device for operating said work holder at various speeds, a tool, means for moving said tool axially of the work simultaneously with the operation of said drive member, including a change speed device, and manually operable means for setting said device for controlling the axial speed of said tool to form in the work a regularly distorted helical element with predetermined length and predetermined degrees of radial advance as per said path, wherein the degrees of radial advance per unit of length along the helix center line, this line being the true diameter of a cylinder, are proportional to the volumes inside the cylinder and between parallel planes bisecting the cylinder, said planes being spaced the same as said units of length and being perpendicular to said helix center line.

CARY HOLLIS NELSON.